(12) United States Patent
Taylor et al.

(10) Patent No.: US 11,223,726 B1
(45) Date of Patent: Jan. 11, 2022

(54) CALL CENTER DATA TRANSFER SYSTEM

(71) Applicant: United Services Automobile Association (USAA), San Antonio, TX (US)

(72) Inventors: Samantha Elizabeth Taylor, Frisco, TX (US); Yogen Rai, Plano, TX (US); Zachery C. Lake, Aubrey, TX (US); Rachel Elizabeth Csabi, Frisco, TX (US); Hollie Ilene King, Frisco, TX (US); Nicholas C. Wheeler, The Colony, TX (US); Victor Kwak, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/031,113

(22) Filed: Sep. 24, 2020

Related U.S. Application Data

(60) Provisional application No. 62/908,380, filed on Sep. 30, 2019.

(51) Int. Cl.
*H04M 3/58* (2006.01)
*H04M 1/727* (2006.01)
*H04M 3/428* (2006.01)

(52) U.S. Cl.
CPC ............ *H04M 3/58* (2013.01); *H04M 1/727* (2013.01); *H04M 3/4286* (2013.01)

(58) Field of Classification Search
CPC ...... H04M 1/727; H04M 3/58; H04M 3/4286; H04M 3/50–5191; H04M 3/523; H04M 3/527; H04M 3/54–548

USPC ................ 379/211.01, 212.01, 265.01–266.1
See application file for complete search history.

(56) References Cited

U.S. PATENT DOCUMENTS

| | | | | |
|---|---|---|---|---|
| 5,469,504 | A * | 11/1995 | Blaha ................... | H04M 3/5237 379/212.01 |
| 9,020,121 | B1 * | 4/2015 | Dhanda ............... | H04M 7/0036 379/207.13 |
| 9,438,712 | B1 * | 9/2016 | Cutajar ............... | H04M 3/5183 |
| 2008/0089486 | A1 * | 4/2008 | Madour ................ | H04L 65/40 379/45 |
| 2009/0285385 | A1 * | 11/2009 | Dunbar ................ | H04M 3/523 379/266.01 |
| 2011/0280391 | A1 * | 11/2011 | Venugopal ........... | H04M 3/523 379/266.1 |

(Continued)

*Primary Examiner* — Hemant S Patel
(74) *Attorney, Agent, or Firm* — Fletcher Yoder P.C.

(57) ABSTRACT

A call center data transfer system includes one or more processors that are configured to receive call data related to information provided by a caller during a first portion of a call with a first customer service representative. The one or more processors are also configured to assign an identifier to the call in response to receipt of an indication that the call should be transferred from the first customer service representative, associate the identifier with the call data in one or more databases, receive the identifier as an input during a second portion of the call with a second customer service representative, and use the identifier to retrieve the call data from the one or more databases. The one or more processors are further configured to display the call data via a display for visualization by the second customer service representative.

13 Claims, 3 Drawing Sheets

(56) References Cited

U.S. PATENT DOCUMENTS

2014/0344169 A1* 11/2014 Phelps ................ G06Q 30/016
  705/304
2020/0058305 A1* 2/2020 Yang .................. H04M 3/5191

* cited by examiner

CALL CENTER DATA TRANSFER SYSTEM

CROSS-REFERENCE TO RELATED APPLICATION

This application claims priority to and the benefit of U.S. Provisional Application No. 62/908,380, entitled "CALL CENTER DATA TRANSFER SYSTEM," filed Sep. 30, 2019, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Business organizations may employ customer service representatives (CSRs) within one or more call centers. The CSRs may be available (e.g., by telephone) to assist a customer with various tasks (e.g., open new accounts, submit complaints, update personal information) and/or to answer the customer's inquiries (e.g., questions regarding products). Furthermore, some large business organizations may have multiple call centers (e.g., multiple separate call centers or multiple separate departments within a call center), and/or the CSRs may be trained to address certain issues (e.g., specialize in certain issues). For example, the CSRs in a first call center may specialize in answering complaints, the CSRs in a second call center may specialize in assisting with new orders, the CSRs in a third call center may specialize in answering questions about a specific product line, and so forth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a call center data transfer system includes one or more processors that are configured to receive call data related to information provided by a caller during a first portion of a call with a first customer service representative. The one or more processors are also configured to assign an identifier to the call in response to receipt of an indication that the call should be transferred from the first customer service representative, associate the identifier with the call data in one or more databases, receive the identifier as an input during a second portion of the call with a second customer service representative, and use the identifier to retrieve the call data from the one or more databases. The one or more processors are further configured to display the call data via a display for visualization by the second customer service representative during the second portion of the call with the second customer service representative.

In one embodiment, a call center data transfer system includes one or more processors that are configured to receive call data related to information provided by a caller during a first portion of a call. The one or more processors are also configured to assign an identifier to the call, wherein the identifier comprises a variation in sound that is embedded in an audio signal. The one or more processors are further configured to associate the identifier with the call data in one or more databases, receive the identifier as an input during a second portion of the call, use the identifier to retrieve the call data from the one or more databases, and display the call data via a display for visualization by a customer service representative during the second portion of the call.

In one embodiment, a method of transferring call data with a call center data transfer system includes receiving, at one or more processors, the call data related to information provided by a caller during a first portion of a call with a first customer service representative. The method also includes assigning, using the one or more processors, an identifier to the call in response to receipt of an indication that the call should be transferred from the first customer service representative. The method further includes associating, using the one or more processors, the identifier with the call data in one or more databases. The method further includes receiving, at the one or more processors, the identifier as an input during a second portion of the call with a second customer service representative. The method further includes retrieving, using the one or more processors, the call data from the one or more databases with the identifier. The method further includes instructing, using the one or more processors, display of an indication of the call data for visualization by the second customer service representative during the second portion of the call with the second customer service representative.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
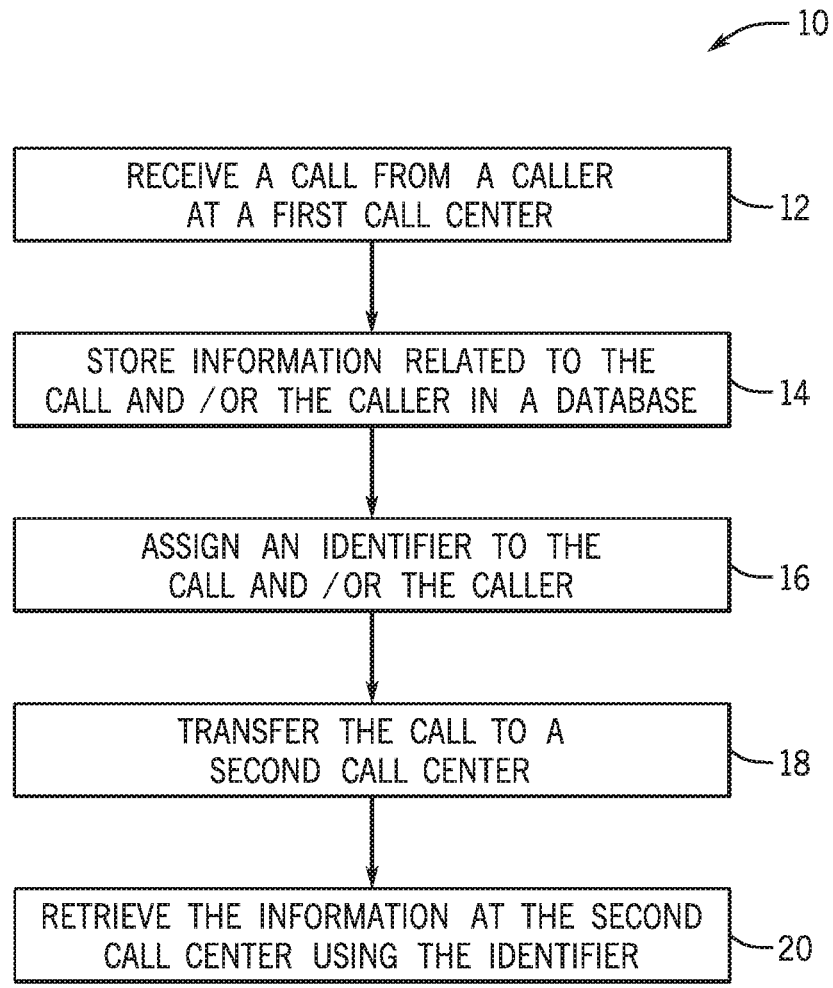
FIG. 1 is a flowchart illustrating a method of transferring call data using a call center data transfer system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Additionally, it should be understood that references to "one embodiment" or "an embodiment" of the present disclosure are not intended to be interpreted as excluding the existence of additional embodiments that also incorporate the recited features.

The present application relates generally to a call center data transfer system. As explained above, some business organizations may employ customer service representatives (CSRs) (e.g., agents) in one or more call centers. In some cases, the CSRs may work in multiple call centers (e.g., multiple separate call centers or multiple separate departments within a call center) and/or the CSRs may be trained to address certain issues. For example, the CSRs in a first call center may specialize in answering complaints, the CSRs in a second call center may specialize in assisting with new orders, the CSRs in a third call center may specialize in answering questions about a specific product line, and so forth. During a call, a customer may speak with multiple different CSRs.

In order to eliminate or reduce repetition (e.g., same questions asked by the CSRs; same information provided by the customer) during the call, the call center data transfer system may associate the call and/or call data (e.g., information provided by the customer during the call) with a unique identifier (e.g., token). The unique identifier may enable the CSRs to access the call data throughout the call. For example, the call center data transfer system may associate the call and/or the call data obtained during a conversation with a first CSR with the unique identifier. Upon transfer of the call to a second CSR, the unique identifier may enable the second CSR to access the call data obtained during the conversation the first CSR. Thus, during the call, the second CSR does not need to repeat questions asked by the first CSR, and the customer does not need to repeat the information that they provided to the first CSR.

FIG. 1 illustrates a flow chart of a method 10 of transferring call data (e.g., information provided by a caller) using a call center data transfer system. The flow chart includes various steps represented by blocks. Although the flow chart illustrates the steps in a certain sequence, it should be understood that the steps may be performed in any suitable order and certain steps may be carried out simultaneously, where appropriate. Further, certain steps may be omitted and/or other steps may be added. While certain steps are described as being performed by the call center data transfer system, it should be understood that the steps or portions thereof may be performed by any suitable processing device within the call center data transfer system and/or by separate devices within the call center data transfer system (e.g., by a central computer system and/or by computer systems associated with call centers).

As shown, the method 10 begins by receiving a call (e.g., phone call) from a caller (e.g., customer) at a first call center in step 12. During the call with the first call center, the caller may provide identifying information and/or indicate a purpose of the call. For example, a first CSR in the first call center may ask the caller one or more questions that are intended to prompt the caller to provide the identifying information and/or to indicate the purpose of the call. The first CSR may input call data, which may include some or all of the identifying information, an indication of the purpose of the call (e.g., a description of the purpose of the call), additional comments or notes about the caller, requests made by the caller, a time of the call, or the like, into the call center data transfer system.

In some embodiments, the first CSR may evaluate the identifying information provided by the caller (e.g., use one piece of identifying information, such as a name of the caller, to look up a profile stored in one or more databases, and then evaluate whether additional pieces of identifying information match the profile to authenticate or to verify an identify of the caller). Additionally or alternatively, the first CSR may input the identifying information provided by the caller into the call center data transfer system to enable the call center data transfer system to evaluate the identifying information provided by the caller (e.g., evaluate whether the identifying information matches the profile to authenticate or to verify the identity of the caller). However, the authentication or the verification of the identity of the caller is an optional step that may not be performed as part of the method 10.

Furthermore, it should be appreciated that step 12 may be carried out by an automated system (e.g., instead of involving participation by the first CSR). For example, the call center data transfer system may include the automated system that is programmed to ask the caller the one or more questions, to receive verbal inputs spoken by the caller in response to the one or more questions, and to analyze the verbal inputs via speech recognition software to thereby determine the identifying information, the purpose of the call, and/or other call data. Regardless of how the call data is obtained by the call center data transfer system, the call center data transfer system then stores the call data to facilitate retrieval by one or more CSRs (e.g., in the first call center or in another call center) in step 14. The call data may be stored in one or more databases (e.g., shared databases; central databases) that are accessible to and/or that are part of the call center data transfer system. It should be appreciated that the call data may also be stored for any of a variety of other purposes, such as for record collection and/or to build the profile for the caller that may be accessed during subsequent calls.

The call center data transfer system may generate and/or assign an identifier (e.g., a unique identifier; a token) to the call and/or to the caller in step 16. Furthermore, the identifier may be associated with the call data in the one or more databases. The identifier may be a word (e.g., elephant), a phrase (e.g., blue elephant), a numeric code (e.g., 123), and/or an alphanumeric code (e.g., A123). The identifier may include common word(s), numbers, and/or letters that are easy to pronounce, easy to hear (e.g., each character or sound is distinct), and/or easy to write. In this way, the identifier may be easier to use and/or understand in verbal communications as compared to the caller's given name, street address, or other identifying information of the caller. In some embodiments, the identifier may have no relation to any of the information that was obtained in step 14 (e.g., the identifier is not generated, selected, or assigned based on the identifying information and/or the purpose of the call), the identifier may have no relation to the information in the profile of the caller (e.g., the identifier is not generated, selected, or assigned based on the profile of the caller), and/or the identifier may be randomly assigned to the call and/or the caller (e.g., not based on the identifying information, the purpose, the profile, and/or a time of the call). However, it should be appreciated that the identifier may be related to the information that was obtained in step 14, such as initials of the caller and a purpose of the call (e.g., ABbank), and/or to the profile of the caller. Once the identifier is assigned in step 16, the identifier may be at least temporarily (e.g., for a duration of the call) removed from a list of available identifiers (e.g., removed from inventory) so that the identifier is not assigned to another caller during the call. In some embodiments, the identifier may be added back to the list of available identifiers and may be used for other calls made by other callers after the call (e.g., immediately after the call; in response to termination of the call).

The identifier may be generated by the call center data transfer system at any suitable time, such as in response to receipt of the call (e.g., in response to the call connecting to any one of the call centers, such that a respective identifier is assigned to each call), in response to a specific question(s) being answered by the caller (e.g., a sufficient amount of identifying information being provided in response to the specific question(s)), upon completion of authentication and/or verification of the identity of the caller, upon an indication that the call will be transferred (e.g., determination that the purpose of the call does not match with the training or expertise of the first CSR), and/or upon request by the first CSR. For example, during the call, the call center data transfer system and/or the first CSR may determine that the call should be transferred to another CSR (e.g., supervisory CSR, a second CSR in the first call center or in a second call center) to better address the purpose of the call, to obtain approval to complete an action, to provide another service, or the like.

Prior to the transfer of the call away from the first CSR and/or prior to the transfer of the call to another CSR, the identifier may be provided to the caller. In some embodiments, the identifier may be provided to the caller via the first CSR. For example, the call center data transfer system may generate and provide the identifier via a display of a workstation of the first CSR for visualization by the first CSR. The first CSR may then read the identifier on the display and verbally provide the identifier to the caller during the call. The first CSR may provide the identifier to the caller, and the first CSR may explain that providing the identifier to the next CSR will enable the next CSR to efficiently access the information related to the caller. However, it should be appreciated that the identifier may be provided to the caller via any of a variety of other techniques. For example, the identifier may be provided to the caller as a notification (e.g., pop-up notification, such as a text message) via an application running on a mobile device of the caller in addition to or as an alternative to being verbally communicated by the first CSR. The notification may enable the caller to remember the identifier throughout the call. Furthermore, the identifier may be provided as an audible message during the call to the caller via an automated system that outputs the identifier in response to the identifier being assigned to the call. In some embodiments, the call center data system may detect that the first CSR has verbally communicated the identifier to the caller (e.g., via speech recognition software, which may scan or monitor verbal communications during the call for the identifier). Then, the call center data transfer system may then initiate the transfer of the call in response to the identifier being provided to the caller. However, it should be appreciated the transfer may occur in other ways, such as via the first CSR providing an input at the workstation of the first CSR to initiate the transfer.

In some embodiments, the call center data transfer system may generate and provide a list of available identifiers via the display of the workstation of the first CSR for visualization by the first CSR (e.g., blue elephant, happy bug, strong coffee, sunny day). The first CSR may select the identifier from the list of available identifiers, such as by clicking on the identifier, which may also at least temporarily (e.g., for the duration of the call) take the identifier out of the list of available identifiers (e.g., remove from inventory) so that the identifier is not assigned to another call during the call. In this way, the identifier may be unique to the call at least during a time of the call and may be used by the caller during the call to enable multiple different CSRs to efficiently access the call data that was stored in step 14 (e.g., without the caller repeating identifying information and/or the purpose of the call).

After the identifier is provided to the caller, the call center data transfer system may then transfer the call, such as to the second CSR in a second call center, in step 18. After the transfer of the call to the second CSR, the second CSR may request the identifier from the caller. The caller may verbally communicate the identifier to the second CSR, and the second CSR may then use the identifier to access the call data that is stored in the one or more databases. For example, upon receipt of the identifier, the second CSR may input the identifier into the call center data transfer system (e.g., via an input device of a workstation of the second CSR). The call center data transfer system may then use the identifier to look up and retrieve the call data for the call from the one or more databases in step 20, and this may trigger display of the call data on the display of the workstation of the second CSR for visualization by the second CSR. In this way, the second CSR may assist the caller without repeating the one or more questions asked by the first CSR and/or without the caller repeating the information that they provided to the first CSR. In some embodiments, the identifier verbally communicated by the caller may be detected by the workstation of the second CSR (e.g., via speech recognition software, which may scan or monitor verbal communications during the call for the identifier), and the call center data transfer system may then use the identifier as set forth in step 20.

In some embodiments, the identifier alone may be sufficient to enable the second CSR to access the call data. However, in some embodiments, the identifier must be provided in combination with at least one type of identifying information (e.g., but less than the identifying information that is provided to the first CSR) in order to enable the second CSR to access the call data. For example, the first CSR may obtain at least two types of identifying information (e.g., at least two of the name, the mailing address, and the account number) of the caller in order to verify the identity of the caller and/or to generate the identifier. Then, the second CSR may obtain the identifier and at least one type of identifying information of the caller to verify the identity of the caller and/or to access the call data. In such cases, the second CSR may input the identifier and the at least one type of identifying information from the caller into the call center data transfer system, which may trigger display of the information related to the caller on the display of the workstation of the second CSR.

As explained above, the call center data transfer system may randomly generate and/or assign the identifier for each incoming call to the business. Such techniques may provide for a secure, efficient identification process and/or efficient access to shared call data by subsequent CSRs during the call. However, in some cases, the call center data transfer system may assign the identifier for each caller and then may utilize the identifier for each incoming call made by the caller to the business organization. Such techniques may be particularly useful in situations where the caller is known to the business organization (e.g., prior to the call) and/or has an established relationship (e.g., a profile, an account) with the business organization. For example, if the caller is a customer (e.g., a holder of an account) of the business organization (e.g., a bank), the caller may set the identifier during a registration processor at another time by logging into the account. In some embodiments, the organization may assign the identifier to the customer for the customer to use during future calls to the business organization. In some such cases, in the event that the customer or other caller forgets the identifier (e.g., pre-set or prearranged identifier assigned prior to the call), the call center data transfer system may randomly generate and/or assign another identifier (e.g., temporary identifier) for use during the call and/or for use during subsequent calls made by the caller. In such cases, the identifier may be utilized to enable rapid access to the call data from the call (and/or from prior calls made by the caller) stored in the one or more databases.

In some embodiments, the call center data transfer system may automatically append the identifier to the call during the transfer by communicating the identifier via audio signals (e.g., audible to a human ear [between 20 Hertz and 20 kilohertz] or inaudible to the human ear [below 20 Hertz and above 20 kilohertz]). Thus, rather than the identifier being a word, a phrase, or other type of code that can be spoken by the caller, the identifier is configured to be embedded in audio signals (e.g., as varying patterns in tone). Then, rather than having the caller verbally communicate the identifier to the second CSR, the identifier may be electronically communicated directly to the workstation of the second CSR (e.g., the workstation or a computer system communicatively coupled to the workstation of the second CSR, which may be considered the receiving workstation or receiving computer system). For example, the identifier may be electronically communicated from the call center data transfer system or from the workstation of the first CSR (e.g., the workstation or a computer system communicatively coupled to the workstation of the first CSR, which may be considered the transferring workstation or transferring computer system) to the workstation of the second CSR system via audio signals that are transmitted during the transfer of the call. The call center data transfer system may be operable to generate and/or to assign the identifier that is embedded in the audio signals. In some embodiments, the call center data transfer system may be operable to instruct and/or to coordinate the delivery of the audio signals during the transfer process.

In some embodiments, the audio signals may be provided to the workstation of the second CSR over a voice line that is being used for the call. Thus, present embodiments may facilitate the present techniques without a separate and parallel communication between respective circuitry of the different workstations and/or call centers, which enables more efficient computer operations. As noted above, the identifier may be transmitted via varying sounds and/or patterns in sounds (e.g., tones) that are inaudible to the human ear to avoid confusion during the call. In some embodiments, the workstation of the first CSR may generate the sounds, which can then be interpreted by the workstation of the second CSR and then used by the workstation of the second CSR to access the call data for the caller in the one or more databases. For example, receipt of the audio signals at the workstation of the second CSR may cause the workstation of the second CSR to initiate a look up of the call data for the caller using the identifier embedded in the audio signals, which may trigger display of the call data for the caller on the display of the workstation of the second CSR.

It should be noted that the circuitry in the computer systems disclosed herein may include one or more processors, memories, circuits, and coded instructions that facilitate generation and identification of the audio signals (e.g., audio communications; tonal communications). Further still, in some embodiments, the call center data transfer system may generate an audible and computer-generated version of the identifier, which may operate as an electronically communicated password that may be used in addition to or as a replacement for the identifier that may be verbally communicated by the caller to the second CSR. The audible and computer-generated version of the identifier may be provided over the voice line during the transfer and may protect against issues due to the caller forgetting the identifier. The audible and computer-generated version of the identifier may be analyzed by the workstation of the second CSR (e.g., via speech recognition software) and/or may be heard by the second CSR so that the second CSR can then provide the input to access the call data for the caller in the manner discussed herein.

Figure 2:
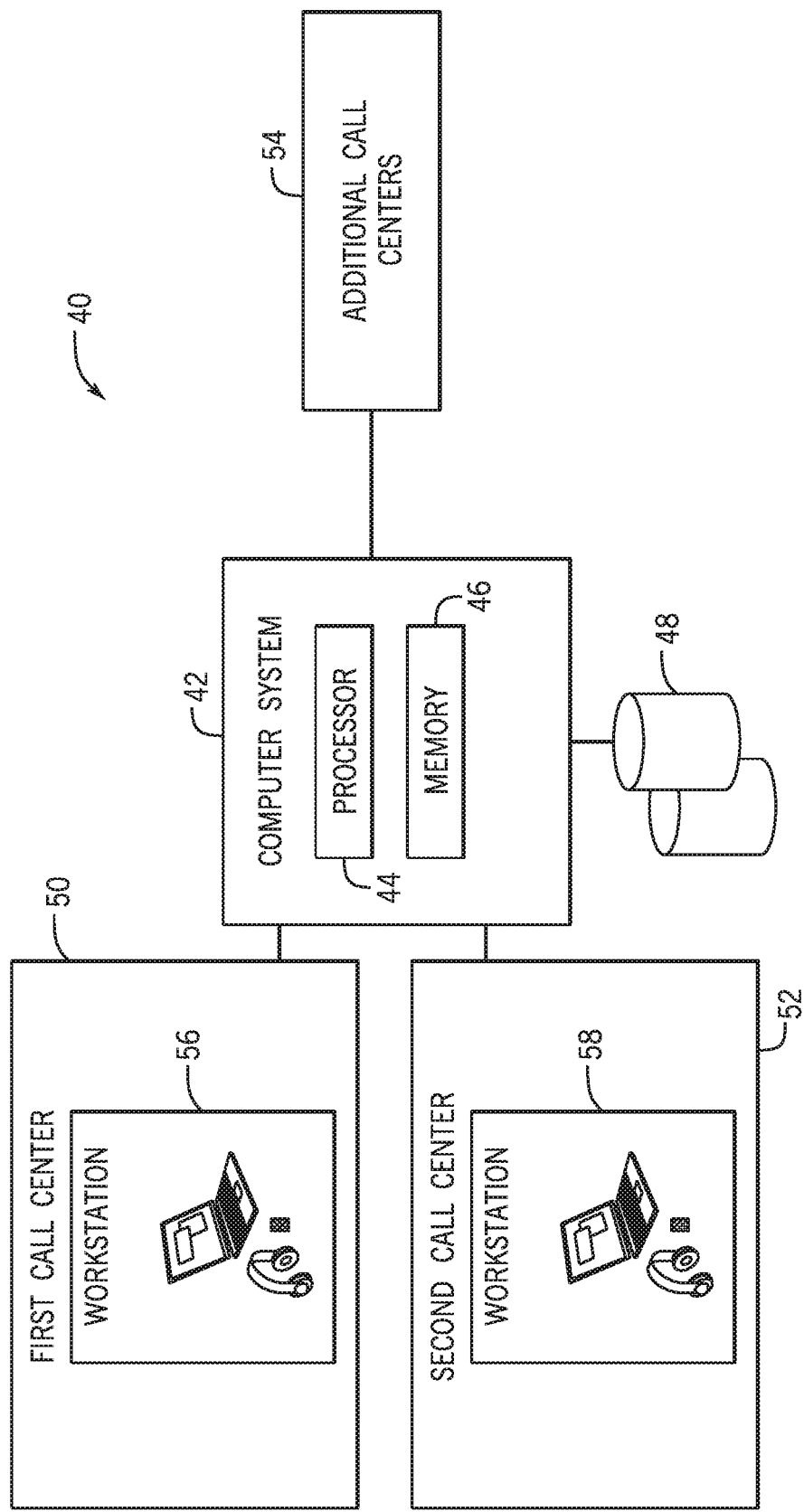
FIG. 2 is a schematic view of a call center data transfer system that may be utilized to transfer call data, in accordance with embodiments described herein.

FIG. 2 is a schematic view of a call center data transfer system 40 that may be used to carry out the method 10 of FIG. 1. The call center data transfer system 40 may include one or more servers and/or other computer systems 42 (e.g., central computer systems) capable of receiving various inputs, processing data, and/or providing various outputs. As explained above, the call data may be provided by the caller and/or may be generated by the CSR(s). The servers and/or computer systems 42 include one or more processors 44, such as the illustrated microprocessor, and one or more memory devices 46. The computer system 42 may also include one or more storage devices, communication devices, and/or other suitable components. The processor 44 may be used to execute software, such as software that enables the call center data transfer system 40 to process the call data, associate the call data with the identifier, store the call data with the identifier in one or more databases 48 (e.g., accessible to the computer system 42 and/or within the computer system 42), and/or enable retrieval of the call data from the one or more databases 48 using the identifier. Moreover, the processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set computer (RISC) processors.

The memory device 46 may include a volatile memory, such as random-access memory (RAM), and/or a nonvolatile memory, such as read-only memory (ROM). The memory device 46 may store a variety of information and may be used for various purposes. For example, the memory device 46 may store processor executable instructions (e.g., firmware or software) for the processor 44 to execute. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

As illustrated, the computer system 42 may be communicatively coupled to multiple call centers, such as a first call center 50, a second call center 52, and one or more additional call centers 54 (e.g., 1, 2, 3, 4, 5, 10, 15, or more). Communicatively coupled should be understood to include wireless and/or wired communication configurations. The computer system 42 may be configured to receive the call from the caller and may be configured to route the call to a desired call center, such as the first call center 50. The computer system 42 may select the desired call center based on a number dialed by the caller, the call center availability, or any other factor. In some embodiments, the call may be received directly at the desired call center without being routed by the computer system 42. Indeed, it should be appreciated than any of the steps disclosed herein as being carried out by the computer system 42 may be carried out by any other suitable processing components, such as processing components that are part of computer systems associated with the call centers (e.g., dedicated to each call center), for example.

At the desired call center, such as the first call center 50, a first CSR may utilize a workstation 56 of the first CSR to communicate with the caller (e.g., using a headset and a microphone of the workstation 56). Information provided by the caller during a conversation between the caller and the first CSR may be manually input by the first CSR using an input device (e.g., keyboard, touchscreen display) of the workstation 56 and/or may be automatically detected (e.g., via speech recognition software) by the workstation 56. The information may be provided from the workstation 56 to the computer system 42, which may then store the information in the one or more databases 48. In some embodiments, the information may only be provided from the workstation 56 to the computer system 42 and/or may only be stored in the one or more databases 48 in response to receipt of an indication that the call should be transferred (e.g., to another CSR).

For example, during the call, the first CSR may determine that the call should be transferred. The first CSR may then provide the indication that the call should be transferred (e.g., the indication may be a request from the first CSR via the workstation 56 that the computer system 42 provide an identifier to be assigned to the call). Then, the computer system 42 may generate and/or provide the identifier to the workstation 56 for display to the first CSR so that the first CSR can then verbally provide the identifier to the caller. As noted above, the computer system 42 may additionally or alternatively provide the identifier to the caller in other ways, such as via a notification on a mobile device of the caller. The computer system 42 may also store the identifier with the call data in the one or more databases 48.

As explained above, the identifier may be a word, a phrase, a numeric code, and/or an alphanumeric code, and the identifier may be associated with the call and/or the caller by the computer system 42. The computer system 42 may automatically generate the identifier upon receipt of the call, at any time during the call, upon request by the first CSR, and/or in response to verification of the identity of the caller (e.g., based on the caller providing multiple types of identifying information to the first CSR).

After the identifier is provided to the caller, the call may be transferred to a second CSR. The second CSR may be located in the first call center or in another call center, such as the second call center 52. The second CSR may answer the call and request the identifier from the caller. The caller may provide the identifier to the second CSR, and the identifier may be either automatically detected (e.g., via speech recognition software) by a workstation 58 of the second CSR or may be manually input by the second CSR using the workstation 58. In some embodiments, the caller may be prompted (e.g., via an automated message delivered upon connection to the workstation 58) to provide the identifier by speaking into the voice line upon connection to the workstation 58, but prior to the second CSR joining the call. In some embodiments, the identifier may be embedded in audio signals that are provided via the voice line to the workstation 58. The identifier may be provided from the workstation 58 to the computer system 42 upon input at the workstation 58. Once the identifier is received by the computer system 42, the computer system 42 then uses the identifier to look up the call data for the call in the one or more databases 48. The computer system 42 then provides the call data to the workstation 58 for visualization by the second CSR. In this way, the caller may not need to repeat all of the information that the caller provided to the first CSR.

Figure 3:
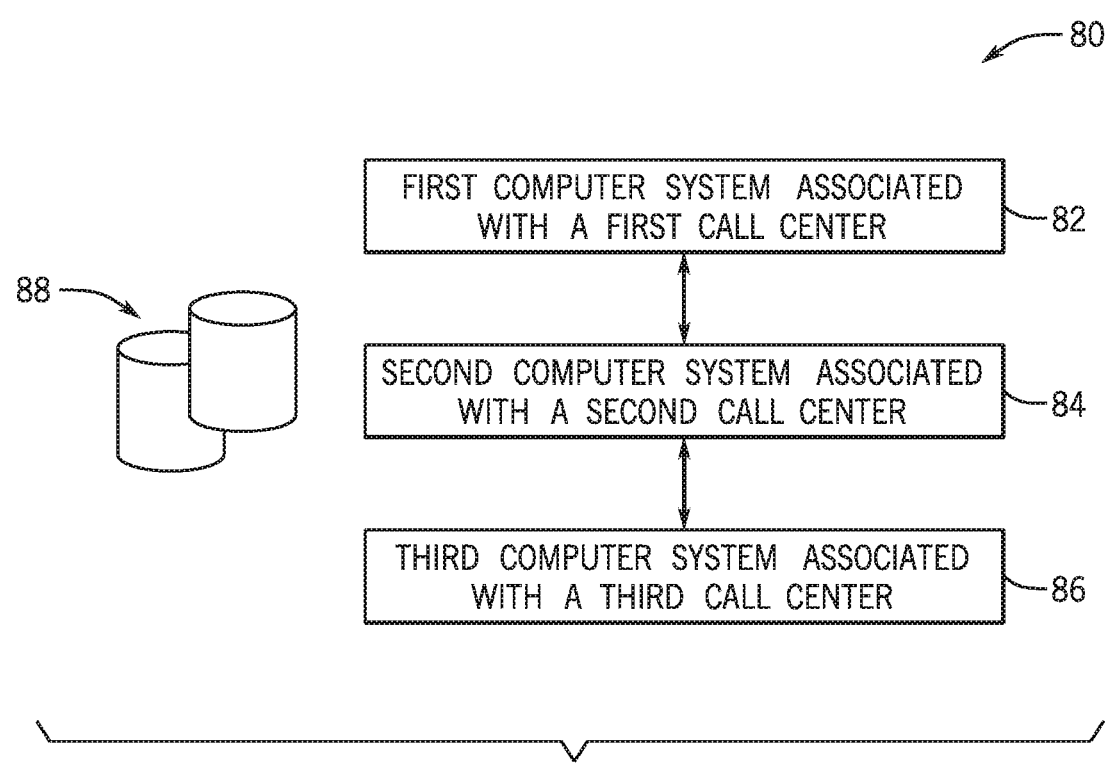
FIG. 3 is a schematic view of a call center data transfer system that may be utilized to transfer call data, in accordance with embodiments described herein.

FIG. 3 is a schematic view of a call center data transfer system 80 that may be utilized to carry out the method 10 of FIG. 1. As illustrated, the call center data transfer system 80 may include multiple servers and/or computer systems. For example, the call center data transfer system 80 includes computer systems 82, 84, and 86 that are each capable of receiving and storing call data obtained during a call with CSR(s) in an associated call center (e.g., from workstation(s) in the associated call center). In other words, each of the computer systems 82, 84, and 86 may support a specific call center or location (e.g., a first computer system 82 may be associated with a first call center, a second computer system 84 may be associated with a second call center, a third call center 86 may be associated with a third call center, and so on.

The computer systems 82, 84, and 86 are communicatively coupled to one another. As explained above, the call may be transferred from one call center (e.g., from the first call center; from the transferring call center) to another call center (e.g., to the second call center or to the third call center; to the receiving call center) to address a request from the caller, to obtain approval to complete an action, to provide another service, or the like. Before transferring the call, the computer system of the transferring call center may generate an identifier and may associate the identifier with the call data. The computer system of the receiving call center may then use the identifier to retrieve the call data from the computer system of the transferring call center. In some embodiments, the computer system of the transferring call center may request the identifier from the computer system of the receiving call center and may then associate the identifier the call data in the computer system of the transferring call center. As explained above, the CSR at the transferring call center may then provide the identifier to the caller, the caller may then provide the identifier to the CSR at the receiving call center for use in accessing and retrieving the call data that was previously stored and associated with the identifier (e.g., in one or more databases 88 accessible to the computer systems, wherein the one or more databases 88 may be part of one or more of the computer systems and/or separate from some of all of the computer systems). By providing the call data in this way, the caller may not need to repeat information to the CSR at the receiving call center.

The technical effects of the systems and methods described herein include a call center data transfer system that reduces redundant communication between a caller and a CSR by associating data generated during the call to an identifier. The identifier may then be used to retrieve previously provided information when the call is transferred. Present embodiments also provide more efficient computer operation by directly communicating data via voice lines (e.g., phone lines) and avoiding separate, but parallel, computer communications in addition to voice communications.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A call center data transfer system, comprising:
one or more processors configured to:
receive call data related to information provided by a caller during a first portion of a call with a first customer service representative;
assign an identifier to the call in response to receipt of an indication that the call should be transferred from the first customer service representative;
associate the identifier with the call data in one or more databases;
receive the identifier as an input from the caller during a second portion of the call with a second customer service representative;
use the identifier to retrieve the call data from the one or more databases; and
display the call data via a display for visualization by the second customer service representative during the second portion of the call with the second customer service representative.

2. The call center data transfer system of claim 1, wherein the one or more processors are configured to randomly assign the identifier to the call.

3. The call center data transfer system of claim 1, wherein the identifier comprises a word or a phrase.

4. The call center data transfer system of claim 1, wherein the one or more processors are configured to verify an identity of the caller based on the information provided by the caller during the first portion of the call with the first customer service representative and to assign the identifier to the call in response to the identity of the caller being verified.

5. The call center data transfer system of claim 1, wherein the one or more processors are configured to select the identifier from a list of available identifiers, and the identifier is removed from the list of available identifiers for a remainder of the call after the one or more processors select the identifier and assign the identifier to the call.

6. The call center data transfer system of claim 5, wherein the one or more processors are configured to add the identifier back to the list of available identifiers for use by other callers during other calls in response to termination of the call.

7. The call center data transfer system of claim 1, wherein the identifier is provided to the caller during the first portion of the call with the first customer service representative via a notification on a mobile device of the caller.

8. The call center data transfer system of claim 1, wherein the one or more processors are configured to detect the identifier via speech recognition software, which enables the one or more processors to receive the identifier as the input during the second portion of the call with the second customer service representative.

9. The call center data transfer system of claim 1, wherein the call data is input by the first customer service representative.

10. A method of transferring call data with a call center data transfer system, comprising:
receiving, at one or more processors, the call data related to information provided by a caller during a first portion of a call with a first customer service representative;
assigning, using the one or more processors, an identifier to the call in response to receipt of an indication that the call should be transferred from the first customer service representative;
associating, using the one or more processors, the identifier with the call data in one or more databases;
receiving, at the one or more processors, the identifier as an input from the caller during a second portion of the call with a second customer service representative;
retrieving, using the one or more processors, the call data from the one or more databases with the identifier; and
instructing, using the one or more processors, display of an indication of the call data for visualization by the second customer service representative during the second portion of the call with the second customer service representative.

11. The method of claim 10, wherein the identifier comprises a word or a phrase.

12. The method of claim 10, comprising randomly assigning, using the one or more processors, the identifier to the call.

13. The method of claim 10, comprising detecting, using the one or more processors, the identifier via speech recognition software to enable receiving the identifier as the input during the second portion of the call with the second customer service representative.

* * * * *